Dec. 25, 1962    S. F. LETO    3,069,874
SHAFT COUPLING
Filed Feb. 17, 1959    2 Sheets-Sheet 1

INVENTOR.
SALVATORE F. LETO
BY
Kenway, Jenney, Witter & Hildreth
ATTORNEYS

Dec. 25, 1962  S. F. LETO  3,069,874
SHAFT COUPLING
Filed Feb. 17, 1959  2 Sheets-Sheet 2
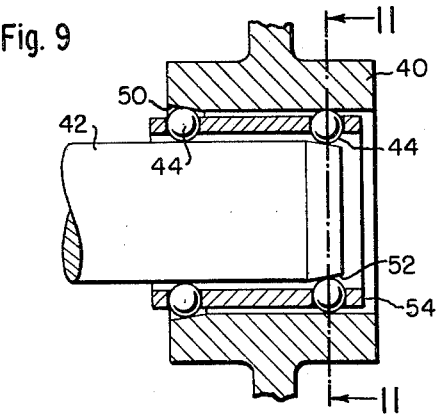
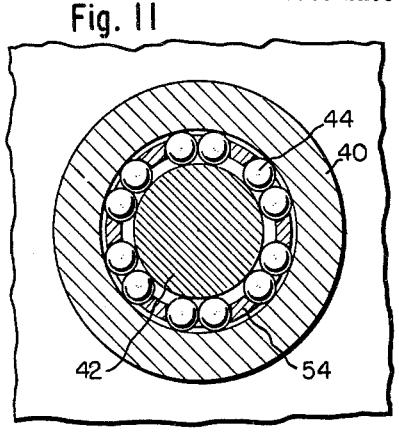
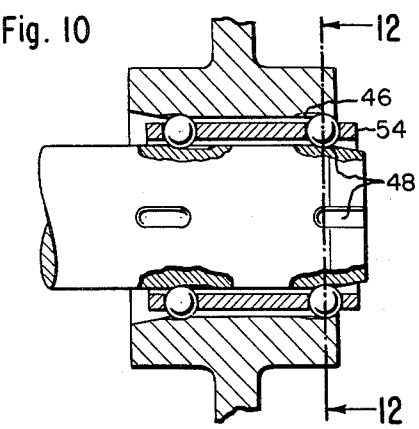
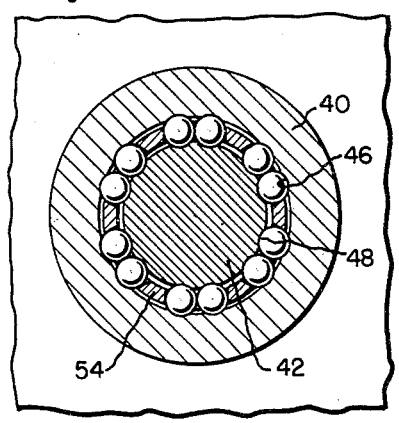
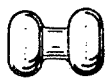
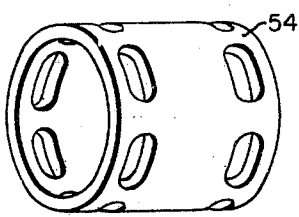
INVENTOR.
SALVATORE F. LETO
BY
Kenway, Jenney, Witter & Hildreth
ATTORNEYS

United States Patent Office 3,069,874
Patented Dec. 25, 1962

3,069,874
SHAFT COUPLING
Salvatore F. Leto, 6 Ernest Road, Arlington, Mass.
Filed Feb. 17, 1959, Ser. No. 793,848
1 Claim. (Cl. 64—8)

This invention relates to coupling devices and comprises a novel device for coupling a pair of substantially aligned rotatable members such that the play or backlash between them is practically eliminated. The coupling of this invention is accordingly useful in numerous applications demanding precise motion control between rotatable members, for instance in analog computers, navigational instruments, and fire control devices, to name but a few.

It is of course recognized that several types of so-called "zero backlashed" coupling devices are known to the art. The object of the present invention is to provide a simple, inexpensive and easily operated device which is reliable and rugged.

In general the coupling device of this invention includes an outer coupling member, which may take the form of a housing, having a central cylindrical chamber, and an inner coupling member having a cylindrical head axially aligned and received within the chamber. The two members are joined by rollers received in corresponding longitudinal grooves formed respectively in the inner wall of the chamber and the outer wall of the head. In the preferred embodiments the rollers are loosely held within an annular cage member which serves to hold the rollers generally in place when the inner and outer coupling members are disconnected. When the coupling is assembled the rollers serve to transmit motion between the two coupling members and to hold them in their assembled relation. The rollers are tightly held between corresponding grooves so as to be under a constant slight elastic deformation effected by the compressive forces exerted between the inner and outer coupling members.

This invention may be embodied in coupling devices of numerous types, including those providing ready connection and disconnection of shafts or other rotatable members, those providing limited flexibility adapted to join shafts that are slightly misaligned. The invention may also, however, be embodied in coupling devices adapted to join accurately aligned shafts more or less permanently or in devices permitting relative axial freedom of motion between the connected shafts, or between a shaft and a hub mounted on the shaft.

These and other features of my invention will be best understood and appreciated from the following detailed description of the coupling device shown in the accompanying drawings in which:

FIGS. 9 through 15 show a second embodiment of this invention;

FIG. 9 is a longitudinal section of the second embodiment showing the inner and outer coupling members preliminary to being assembled in coupled relation;

FIG. 10 is a longitudinal section of the second embodiment showing the inner and outer coupling members in assembled relation;

FIG. 11 is a transverse section taken at 11—11 in FIG. 9;

FIG. 12 is a transverse section taken at 12—12 of FIG. 10;

FIG. 13 is a pictorial view of the annular cage member of the second embodiment; and FIGS. 14 and 15 show forms of roller members useful in the second embodiment.

Figure 7:
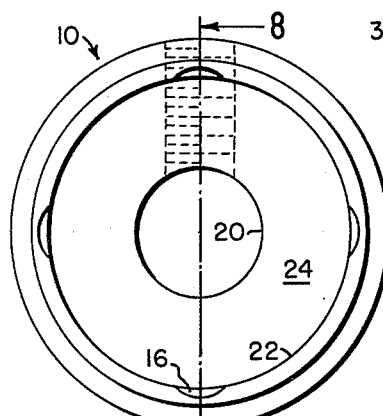
FIGS 7 and 8 are respectively an end view and a longitudinal cross-section of the outer coupling member of the embodiment shown in FIG. 1.
Figure 8:
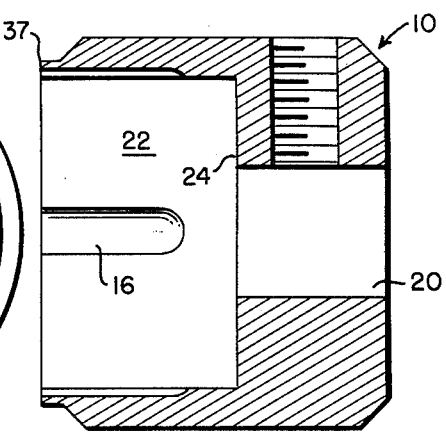

An embodiment of the invention especially adapted for joining shafts that are slightly misaligned, and in that sense providing a flexible coupling member having practically no play or backlash is shown in FIGS. 1 to 8. This embodiment consists generally of an outer coupling member designated generally as 10, an inner coupling member designated generally as 12, and rollers 14 engaged between appropriately formed grooves 16 and 18 provided respectively in the outer and inner coupling members. The outer coupling member 10, as best shown in FIGS. 7 and 8, is in the form of a housing bored at one end to receive a shaft, as shown at 20, and recessed at its other end to form a center cylindrical chamber 22 terminating at its inner end in an annular shoulder 24. The longitudinal grooves 16 are formed in the inner wall of the chamber 22.

Figure 3:
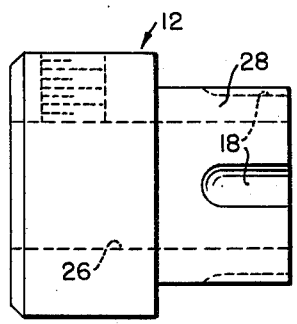
FIG. 3 and 4 are respectively side and end views of the inner coupling member of the embodiment shown in FIG. 1.
Figure 4:
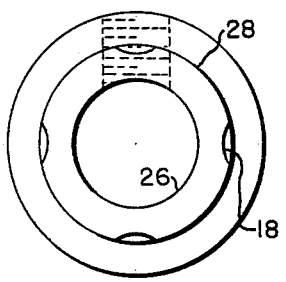
Figure 5:
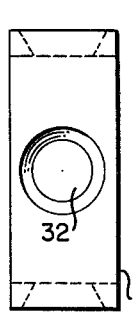
FIGS. 5 and 6 are respectively side and end views of the annular cage member in the embodiment shown in FIG. 1.
Figure 6:
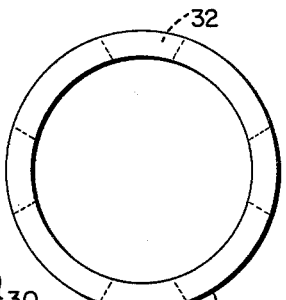

The inner coupling member, as best shown in FIGS. 3 and 4, is in the form of a collar which is bored as at 26 to receive the other of the shafts to be coupled. The functional end of the inner coupling member is in the form of a cylindrical head 28 of diameter less than the internal diameter of the bore 22 and the longitudinal grooves 18 are formed on its outer surface in a manner permitting respective alignment with the grooves 16 such that the ball members 14 may be retained between them.

Figure 1:
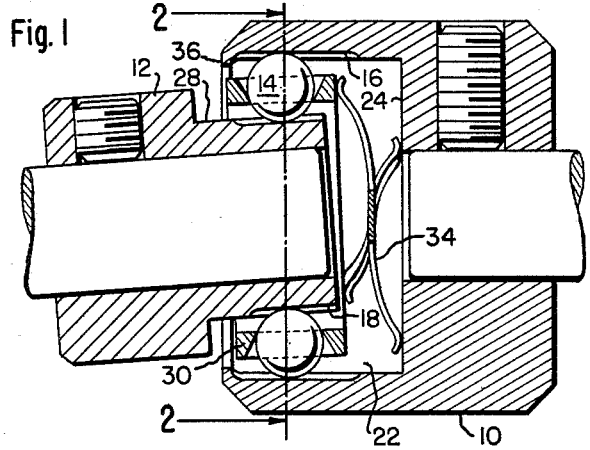
FIG. 1 is a longitudinal cross-section of one preferred embodiment of this invention.
Figure 2:
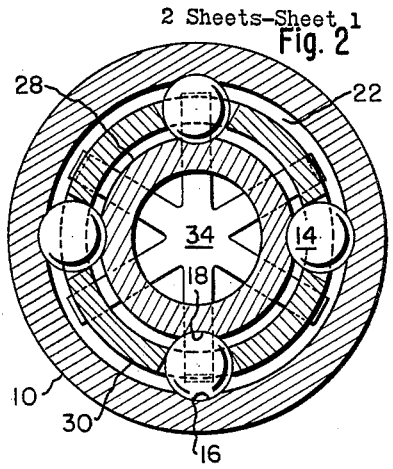
FIG. 2 is a transverse section taken at 2—2 in FIG. 1.

To facilitate assembly and to hold the balls in place when the inner and outer coupling members are disengaged, there is provided a ball cage 30 having outwardly opening conical openings 32 in which the balls 14 may be received as shown in FIGS. 1 and 2. The openings 32 have a smaller inner diameter which is less than the diameter of the balls so that when the cage member 30 is assembled with the balls 14 located within the openings 32 and within the chamber 22, the balls are held generally in their assembled relation.

The inner and outer coupling members 12 and 10 are assembled by inserting the inner coupling member 12 into the outer coupling member 10 in such a manner that the balls 14 are initially engaged at the outer ends of the grooves 18 and are then forced inwardly to roll along the length of the grooves 16 and 18. In so doing, the balls are placed under a slight elastic deformation to provide a coupling which is free of play or backlash. In the embodiment illustrated, a six-fingered leaf spring 34 is located between the shoulder 24 of the outer coupling member and the ball cage 30 to urge the balls to the outer end of the grooves 16 when the coupling members are disconnected and an inturned lip 36 is formed at the open end of the bore 22 to prevent the balls 14 and cage 30 from accidentally falling out of the chamber 22. The lip 36 is conveniently formed from an outwardly extending flange 37 initially formed at the mouth of the chamber 22 by turning the flange 37 inwardly after the spring 34, balls 14 and cage 30 have been assembled within the chamber 22.

An embodiment of the invention adapted to provide rigid and permanent coupling with or without some axial freedom of motion, is shown in FIGS. 9–15. In that embodiment the outer coupling member is in the form of a hub 40 which may be part, for instance, of a wheel or other member which may be desirable mounted to a shaft, and the inner coupling member is an integral part of the shaft 42, although a separate inner member may be provided if desired. This embodiment additionally features a pair of roller members 44 providing spaced points of support by which the hub and shaft may be supported relatively to each other against axial misalignment. The roller members are tightly retained in grooves 46 and 48 formed respectively on the inner surfaces of the hub 40 and the outer surface of the shaft 42. Conveniently the grooves 46 and 48 are formed during the step of assembling the two members by forcefully pressing roller members between them. For this purpose the ends of the bore in the hub 40 and the end of the shaft 42 are provided with terminal tapered regions 50 and 52, respectively, and one set of rollers 44 is initially positioned between the shaft taper 52 and the bore of the hub 40 while the other annular set of rollers is initially positioned between the bore taper 50 and the body of the shaft 42. The two members may then be pressed inwardly together under sufficient force to plastically deform both the inner bore of the hub 40 and the outer surface of the shaft 42 to form the respective grooves 46 and 48.

In this embodiment the roller members are preferably elongated in order to provide stability against relative angular rotation of the hub and shaft as could occur if the roller members were in the form of balls which would be free to rotate in a circumferential direction. The rollers are shown in FIG. 14 as being in the form of a pair of balls welded together and in FIG. 15 as a member of dumbbell shape.

The roller members 44 are conveniently held initially in an intermediate cage member 54 which is shown in FIG. 13 as being in the form of a sleeve having its walls perforated in two annular rings to form chambers for initially receiving and retaining the roller members 44.

The foregoing description is presented as representative of the numerous coupling devices in which this invention may be embodied. Various additional and more or less optional features may, of course, be incorporated in the structures. Where the inner and outer members of the couplings are designed to be fastened to a pair of shafts, these members may be provided with set screw attachments such as shown at 39 in the embodiments of FIGS. 1–8. Alternatively the inner and outer coupling members may be integral parts of the members to be fastened together as suggested in the embodiments of FIGS. 9–15. Limited flexibility is provided by utilizing a single set of connecting roller members, as in the first embodiment, in which case a slight misalignment of the shaft causes further elastically deformation of the roller members 14. Tendency to play or backlash is then further minimized because of the additional tightness of the coupling. The coupling of the second embodiment permits no misalignment but rather provides a ready and simple device by which the inner and outer members are inherently aligned when the members are assembled.

In both embodiments it will be seen that the rollers, although compressed elastically, are free to roll the length of the grooves retaining them and to this extent the couplings are in the nature of a free running spline which permits some limited degree of axial freedom of motion.

Although this invention has been described in detail with reference to two preferred embodiments, it is contemplated that obvious modifications will occur to those skilled in the art and familiar with this disclosure and that such may be made without departing from the scope of this invention.

Having thus disclosed my invention and described in detail preferred embodiments thereof, I claim and desire to secure by Letters Patent:

A coupling device for joining rotatable members comprising an outer coupling member open at one end to define a cylindrical chamber having longitudinal grooves in the chamber wall, an inner coupling member having a cylindrical head received within said chamber and having corresponding longitudinal grooves formed therein, roller members received between said grooves connecting the inner and outer coupling members together, and an annular cage member between said inner and outer coupling members, said annular cage member having openings receiving said roller members, holding said roller members substantially in place when said coupling members are disassembled, and yielding means urging said cage member outwardly from the outer coupling member.

References Cited in the file of this patent

UNITED STATES PATENTS

| | | |
|---|---|---|
| 1,524,161 | Weiss | Jan. 27, 1925 |
| 1,915,654 | Edmunds | June 27, 1933 |
| 2,562,729 | Merwin | July 31, 1951 |
| 2,772,094 | Tamilkowski | Nov. 27, 1956 |
| 2,787,144 | Chauvel | Apr. 2, 1957 |
| 2,885,872 | Burnette | May 12, 1959 |

FOREIGN PATENTS

| | | |
|---|---|---|
| 19,605 | Great Britain | Aug. 17, 1911 |
| 626,779 | Great Britain | July 21, 1949 |
| 885,946 | Germany | Aug. 10, 1953 |